United States Patent
Aki et al.

(10) Patent No.: US 7,353,269 B2
(45) Date of Patent: Apr. 1, 2008

(54) NETWORK MONITORING SYSTEM

(75) Inventors: Yuko Aki, Kawasaki (JP); Hideaki Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 518 days.

(21) Appl. No.: 09/864,000

(22) Filed: May 23, 2001

(65) Prior Publication Data

US 2002/0083169 A1 Jun. 27, 2002

(30) Foreign Application Priority Data

Dec. 21, 2000 (JP) ............................. 2000-388480

(51) Int. Cl.
*G06F 15/173* (2006.01)

(52) U.S. Cl. ...................... 709/224; 709/223; 709/225; 709/229

(58) Field of Classification Search ................ 709/224, 709/223, 225, 226, 229
See application file for complete search history.

(56) References Cited

U.S. PATENT DOCUMENTS

| | | | | |
|---|---|---|---|---|
| 5,557,747 A | * | 9/1996 | Rogers et al. | 709/223 |
| 6,028,842 A | * | 2/2000 | Chapman et al. | 370/235 |
| 6,104,700 A | * | 8/2000 | Haddock et al. | 370/235 |
| 6,170,009 B1 | * | 1/2001 | Mandal et al. | 709/223 |
| 6,259,679 B1 | * | 7/2001 | Henderson et al. | 370/254 |
| 6,317,788 B1 | * | 11/2001 | Richardson | 709/224 |
| 6,446,123 B1 | * | 9/2002 | Ballantine et al. | 709/224 |
| 6,453,268 B1 | * | 9/2002 | Carney et al. | 702/186 |
| 6,484,261 B1 | * | 11/2002 | Wiegel | 713/201 |
| 6,505,244 B1 | * | 1/2003 | Natarajan et al. | 709/223 |
| 6,530,024 B1 | * | 3/2003 | Proctor | 713/201 |
| 6,578,076 B1 | * | 6/2003 | Putzolu | 709/223 |
| 6,609,083 B2 | * | 8/2003 | Enck et al. | 702/186 |
| 6,611,864 B2 | * | 8/2003 | Putzolu et al. | 709/223 |
| 6,678,835 B1 | * | 1/2004 | Shah et al. | 714/4 |
| 6,718,380 B1 | * | 4/2004 | Mohaban et al. | 709/223 |
| 6,928,394 B2 | * | 8/2005 | Bauchot et al. | 702/188 |
| 6,931,356 B2 | * | 8/2005 | Bauchot | 702/188 |
| 2003/0051124 A1 | * | 3/2003 | Dowling | 712/244 |

* cited by examiner

*Primary Examiner*—LaShonda Jacobs
(74) *Attorney, Agent, or Firm*—Greer, Burns & Crain, Ltd.

(57) ABSTRACT

A network monitoring system which monitors activities on a network with optimal coverage and frequency, depending on the current state of the network. A monitoring policy setting unit sets a specific monitoring policy that includes: which object to watch, which item of that object to monitor, and how frequent it should be. According to this policy, a monitoring unit carries out monitoring of the network. The monitoring result is passed to a monitoring policy changing unit, which changes the current monitoring policy being set in the monitoring policy setting unit. Some related resources on the network may also be reconfigured according to the reported monitoring result, by a resource setup changing unit. An event detector detects a particular event occurred in the network resources and notifies the monitoring policy changing unit of the occurrence, so that the monitoring policy will be changed accordingly.

8 Claims, 16 Drawing Sheets

EDIT: ITEM #1

| SL GRADE | CRITERIA | DESCRIPTION |
|---|---|---|
| HIGH | APPLICABLE RANGE | Tr < 5 [SECOND] |
| | MONITORING INTERVAL | LENGTHEN BY 100% (MAX 30 MINUTES) |
| | RELATED ITEMS | WITHDRAW ITEMS #2 AND #3, IF "HIGH" CONTINUES FOR 3 CONSECUTIVE |
| | RELATED RESOURCES | NO CHANGES REQUIRED |
| | ACTION ON EVENT | CHANGE TO "LOW" |
| AVERAGE | APPLICABLE RANGE | 5 ≦ Tr < 8 [SECOND] |
| | MONITORING INTERVAL | LENGTHEN BY 50% (MAX 30 MINUTES) |
| | RELATED ITEMS | WITHDRAW ITEMS #2 AND #3, IF "AVERAGE" CONTINUES FOR 5 |
| | RELATED RESOURCES | NO CHANGES REQUIRED |
| | ACTION ON EVENT | CHANGE TO "LOW" |
| LOW | APPLICABLE RANGE | 8 ≦ Tr < 15 [SECOND] |
| | MONITORING INTERVAL | SHORTEN BY 50% (MIN 3 MINUTES) |
| | RELATED ITEMS | ADD ITEMS #2 AND #3, IF "LOW" CONTINUES FOR 2 CONSECUTIVE |

DEFAULT    EDIT    OK

FIG. 7

| SL GRADE | CRITERIA | DESCRIPTION |
|---|---|---|
| HIGH | APPLICABLE RANGE | Tr < 5 [SECOND] |
| | MONITORING INTERVAL | ELONGATE BY 100% (MAX 30 MINUTES) |
| | RELATED ITEMS | WITHDRAW ITEMS #2 AND #3, IF "HIGH" CONTINUES FOR 3 CONSECUTIVE |
| | RELATED RESOURCES | NO CHANGES REQUIRED |
| | ACTION ON EVENT | CHANGE TO "LOW" |
| AVERAGE | APPLICABLE RANGE | 5 ≦ Tr < 8 [SECOND] |
| | MONITORING INTERVAL | LENGTHEN BY 50% (MAX 30 MINUTES) |
| | RELATED ITEMS | WITHDRAW ITEMS #2 AND #3, IF "AVERAGE" CONTINUES FOR 5 CONSECUTIVE |
| | RELATED RESOURCES | NO CHANGES REQUIRED |
| | ACTION ON EVENT | CHANGE TO "LOW" |
| LOW | APPLICABLE RANGE | 8 ≦ Tr < 15 [SECOND] |
| | MONITORING INTERVAL | SHORTEN BY 50% (MIN 3 MINUTES) |
| | RELATED ITEMS | ADD ITEMS #2 AND #3, IF "LOW" CONTINUES FOR 2 CONSECUTIVE INTERVALS |
| | RELATED RESOURCES | NO CHANGES REQUIRED |
| | ACTION ON EVENT | CHANGE TO "LOWEST" |
| LOWEST | APPLICABLE RANGE | 15 ≦ Tr [SECOND] |
| | MONITORING INTERVAL | SHORTEN BY 50 % (MIN 1 MINUTE) |
| | RELATED ITEMS | ADD ITEMS #2 AND #3 |
| | RELATED RESOURCES | RAISE PRIORITY IF " LOWEST " CONTINUES FOR 3 CONSECUTIVE INTERVALS |
| | ACTION ON EVENT | RAISE PRIORITY |

FIG. 8

| DEFAULT SETUP: ITEM #1 | |
|---|---|
| CRITERIA | DESCRIPTION |
| MONITORING OBJECT | RESPONSE TIME BETWEEN WEB SERVER Sa AND WEB CLIENT Ca |
| MONITORING INTERVAL | 10 MINUTES |
| REFERENCE VALUE | MEASURED VALUE |
| RELATED EVENT | EVENT TO BE RAISED WHEN RESPONSE TIME EXCEEDS 18 SECONDS |

FIG. 9

| SL GRADE | CRITERIA | DESCRIPTION |
|---|---|---|
| HIGH | APPLICABLE RANGE | Tr < NOMINAL + 10 [ms] |
| | MONITORING INTERVAL | LENGTHEN BY 100% (MAX 30 MINUTES) |
| | RELATED ITEMS | WITHDRAW IF "HIGH" CONTINUES FOR 3 CONSECUTIVE INTERVALS |
| | RELATED RESOURCES | NO CHANGES REQUIRED |
| | ACTION ON EVENT | CHANGE TO "LOW" |
| AVERAGE | APPLICABLE RANGE | NOMINAL + 10 ≦ Tr < NOMINAL + 50 [ms] |
| | MONITORING INTERVAL | LENGTHEN BY 50% (MAX 30 MINUTES) |
| | RELATED ITEMS | WITHDRAW IF "AVERAGE" CONTINUES FOR 5 CONSECUTIVE INTERVALS |
| | RELATED RESOURCES | NO CHANGES REQUIRED |
| | ACTION ON EVENT | CHANGE TO "LOW" |
| LOW | APPLICABLE RANGE | NOMINAL + 50 ≦ Tr [ms] |
| | MONITORING INTERVAL | SHORTEN BY 50 % (MIN 3 MINUTES) |
| | RELATED ITEMS | ADD ITEM #3, IF "LOW" CONTINUES FOR 2 CONSECUTIVE INTERVALS |
| | RELATED RESOURCES | RAISE PRIORITY |
| | ACTION ON EVENT | RAISE PRIORITY |

FIG. 10

| SL GRADE | CRITERIA | DESCRIPTION |
|---|---|---|
| HIGH | APPLICABLE RANGE | X < 50 [%] |
| | MONITORING INTERVAL | LENGTHEN BY 100% (MAX 30 MINUTES) |
| | RELATED ITEMS | WITHDRAW IF "HIGH" CONTINUES FOR 3 CONSECUTIVE INTERVALS |
| | RELATED RESOURCES | NO CHANGES REQUIRED |
| | ACTION ON EVENT | CHANGE TO "LOW" |
| AVERAGE | APPLICABLE RANGE | 50 ≦ X < 75 [%] |
| | MONITORING INTERVAL | LENGTHEN BY 50% (MAX 30 MINUTES) |
| | RELATED ITEMS | WITHDRAW IF "AVERAGE" CONTINUES FOR 5 CONSECUTIVE INTERVALS |
| | RELATED RESOURCES | NO CHANGES REQUIRED |
| | ACTION ON EVENT | CHANGE TO "LOW" |
| LOW | APPLICABLE RANGE | 75 ≦ X < 95 [%] |
| | MONITORING INTERVAL | SHORTEN BY 50% (MIN 3 MINUTES) |
| | RELATED ITEMS | NONE |
| | RELATED RESOURCES | NO CHANGES REQUIRED |
| | ACTION ON EVENT | CHANGE TO "LOWEST" |
| LOWEST | APPLICABLE RANGE | 95 ≦ X [%] |
| | MONITORING INTERVAL | SHORTEN BY 50% (MIN 1 MINUTE) |
| | RELATED ITEMS | NONE |
| | RELATED RESOURCES | NO CHANGES REQUIRED |
| | ACTION ON EVENT | SEND WARNING MESSAGE TO ADMINISTRATOR |

FIG. 11

| WEB SERVER Sa | |
|---|---|
| SL GRADE | HIGH |
| RESPONSE TIME | 3.1 SECONDS |
| MONITORING INTERVAL | 20 MINUTES |
| ITEMS ADDED | NONE |
| RELATED RESOURCES | NONE |
| EVENTS RAISED | NONE |

FIG. 12

NETWORK MONITORING SYSTEM

BACKGROUND OF THE INVENTION

1. Field of the Invention

The present invention relates to a network monitoring system and method. More particularly, the present invention relates to a system and method for monitoring activities on a network, and also to a computer-readable medium which stores a computer program that provides such network monitoring functions.

2. Description of the Related Art

For better operations and management of a network, the network administrator has to understand the current performance of the network, and if any problem is found, he/she should take necessary measures, such as changing some setup parameters, according to the perceived network status. Generally, the task of monitoring a network is carried out on a predefined set of monitoring rules and conditions, or "monitoring policy." While actual network conditions may vary with time, conventional network monitoring systems are designed to use a fixed monitoring policy. When some of the current monitoring rules do not fit the actual network conditions, it is the network administrator's task to intervene in the monitoring operations and modify the policy definitions.

Conventionally, the network administrator sets an appropriate threshold for a particular item of interest, so that an alert message will be generated to notify him/her of the occurrence of a condition change in that item. In response to the alert, the administrator modifies the setup of the network in an attempt to maintain its expected performance level. One problem with this conventional method is that there is a time lag between the occurrence of a network event and the action taken by the network administrator. Another problem is that the quality level of network management depends too much on the skill level of the administrator, since a large part of threshold selection and network reconfiguration is carried out on the basis of his/her personal view and knowledge.

SUMMARY OF THE INVENTION

Taking the above into consideration, an object of the present invention is to provide a system and method for monitoring activities on a network in an adaptive manner, dynamically changing their monitoring policy according to the perceived network conditions.

To accomplish the above object, the present invention provides a network monitoring system which monitors activities on a network. This network monitoring system comprises the following elements: (a) a monitoring policy setting unit which sets a monitoring policy; (b) a monitoring unit which monitors the network according to the policy set in the monitoring policy setting unit; and (c) a monitoring policy changing unit which changes the current monitoring policy being set in the monitoring policy setting unit, according to a monitoring result reported by the monitoring unit.

Further, to accomplish the above object, the present invention provides a method of monitoring activities on a network. This network monitoring method comprises the following steps: (a) setting a monitoring policy; (b) monitoring the network according to the policy set at the step (a); and (c) changing the current monitoring policy that is originally set at the step (a), according to a monitoring result obtained at the step (b).

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 shows an example screen which appears when the button 60b shown in FIG. 5 is pressed;

FIG. 8 shows an example of a table corresponding to what is stored as Item #1 in the database;

FIG. 9 shows an example screen which appears when the button 70e shown in FIG. 7 is pressed;

FIG. 10 shows an example of a table corresponding to what is stored as Item #2 in the database;

FIG. 11 shows an example of a table corresponding to what is stored as Item #3 in the database;

FIG. 12 shows an example of a monitor screen displayed when the button 50 g shown in FIG. 5 is pressed;

DESCRIPTION OF THE PREFERRED EMBODIMENTS

Preferred embodiments of the present invention will be described below with reference to the accompanying drawings.

Figure 1:
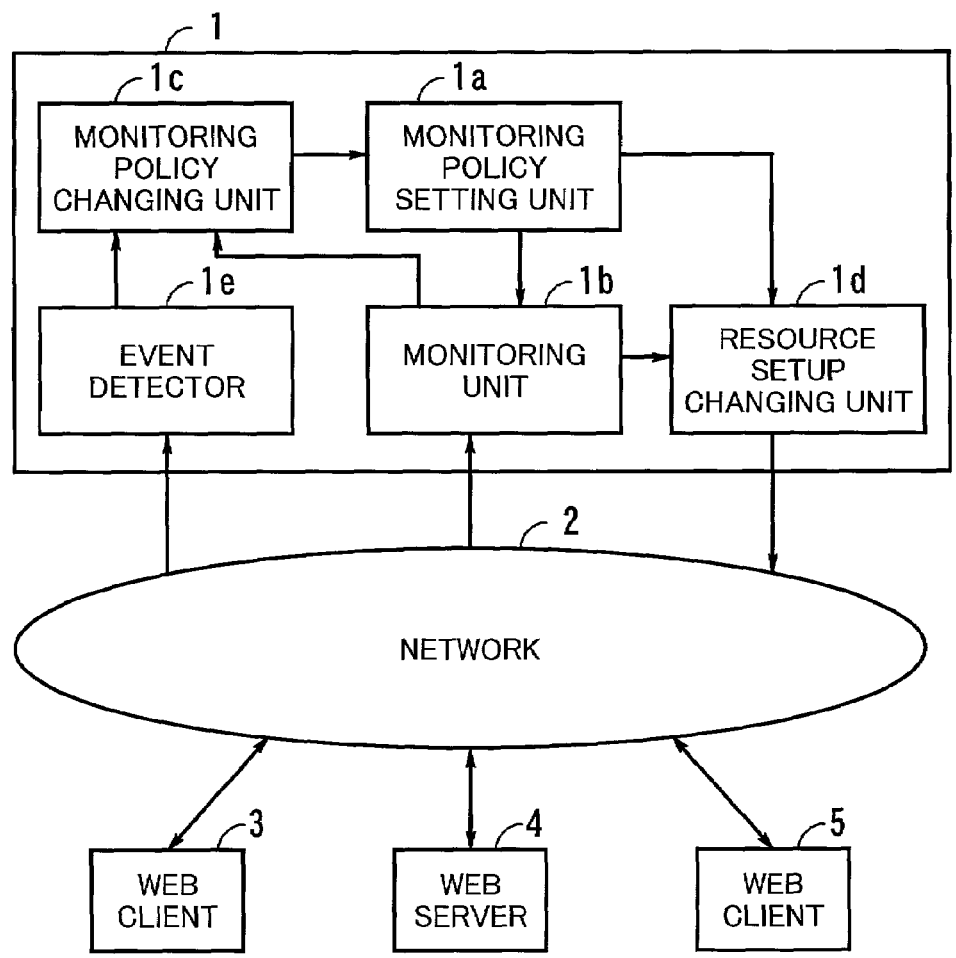
FIG. 1 shows a conceptual view of a network monitoring system according to the present invention.

FIG. 1 shows a conceptual view of a network monitoring system according to the present invention. This network monitoring system 1 monitors activities of devices on a network 2 and/or links interconnecting them. According to the invention, the system 1 comprises the following elements: a monitoring policy setting unit 1a, a monitoring unit 1b, a monitoring policy changing unit 1c, a resource setup changing unit 1d, and an event detector 1e.

The monitoring policy setting unit 1a sets a monitoring policy, including various rules and criteria, on which the system 1 monitors the network 2. The monitoring unit 1b watches activities on the network 2 according to the monitoring policy being set in the monitoring policy setting unit 1a. The monitoring policy changing unit 1c changes the current monitoring policy held in the monitoring policy setting unit 1a, according to the monitoring results reported by the monitoring unit 1b. The resource setup changing unit 1d changes the setup of a predetermined resource on the network 2 according to the monitoring results reported by the monitoring unit 1b. The event detector 1e detects an event that has occurred in a predetermined resource on the network 2. In response to that event, the monitoring policy changing unit 1c changes the current monitoring policy in the monitoring policy setting unit 1a.

The network 2 may be the Internet or any other type of communication network. The devices deployed on the network 2 include a web server 4 and web clients 3 and 5. The web clients 3 and 5 are, for example, personal computers with the capability to make access to the web server 4 and request desired information. The web server 4, built on an appropriate server machine platform, responds to those requests from the web clients 3 and 5 by sending the requested information back to them.

The above mechanism of the proposed network monitoring system 1 works as follows. The network administrator first determines which monitoring policy to choose in operating the network 2, thus establishing a particular monitoring policy in the monitoring policy setting unit 1a. When the administrator commands the system 1 to start monitoring the network 2, the monitoring unit 1b identifies which network objects are to be monitored, by referring to the policy data in the monitoring policy setting unit 1a. The monitoring unit 1b then starts monitoring the objects at predetermined intervals.

Think of, for example, a monitoring policy where the web server 4 is specified as an object to be monitored and its response time to the web client 3 is designated as an item to be monitored. Given such a policy, the monitoring unit 1b measures the specified response time (i.e., the time between a request from the web client 3 and its corresponding response from the web server 4) at a predetermined interval (e.g., every ten minutes), the result being reported from the monitoring unit 1b to the monitoring policy changing unit 1c for evaluation. Suppose, for example, that the result report indicates a decreased service level of the object of interest, i.e., the web server 4. The monitoring policy changing unit 1c then expands the scope of the monitoring unit 1b in an attempt to locate the cause of the problem. More specifically, it adds the response time between the web server 4 and web client 5 and that between the web server 4 and a router (not shown) as new monitoring items. It also reduces the monitoring interval from 10 minutes to 5 minutes. These changes enable the monitoring unit 1b to collect more information about the network 2, so that the network monitoring system 1 will be able to analyze the situation in greater detail to investigate the cause of the low service-level problem.

In the case a low service level is observed for more than a predetermined period, the resource setup changing unit 1d takes an appropriate action, such as giving a higher priority to the packets from the web server 4 over those from other web servers (not shown) on the network 2. With this corrective action, the web server 4 is expected to recover its normal service level. When such service level recovery is observed, the monitoring policy changing unit 1c turns back the broadened scope of the monitoring unit 1b to the previous state, as well as increasing the monitoring interval. These changes will reduce the extra network loads caused by the monitoring operation.

The above explanation has assumed that the service level of the web server 4 tends to vary gradually. In reality, however, the service level can drop suddenly for any reason. According to present invention, the network monitoring system 1 may modify its monitoring policy, stimulated by such abrupt changes in the service level or any other particular conditions, such as the CPU utilization in the web server 4.

More specifically, when a certain event has happened in the web server 4 that is currently monitored, the event detector 1e changes the monitoring policy held in the monitoring policy setting unit 1a according to what kind of event it is. It should be noted that this policy change is carried out independently of the monitoring unit 1b, whose task is to collect data on a regular basis. When, for example, the web server 4 experiences a sudden increase in its CPU load, or when there is a sudden drop in its service level, the event detector 1e shortens the monitoring interval of the monitoring unit 1b and/or puts additional items into its monitoring policy in an attempt to collect enough information to locate the cause of the problem.

As described above, the proposed network monitoring system dynamically varies its monitoring policy according to the result of each monitoring session, thus making it possible to collect data from a network in an optimal way that is suitable for the present network condition. The proposed monitoring system also covers sudden events related to the network activity by adaptively changing its monitoring policy so as to collect all necessary information. Further, the proposed system varies the allocation of resources in accordance with the current network condition. This feature prevents the network from staying at a low service level for a long time.

Figure 2:
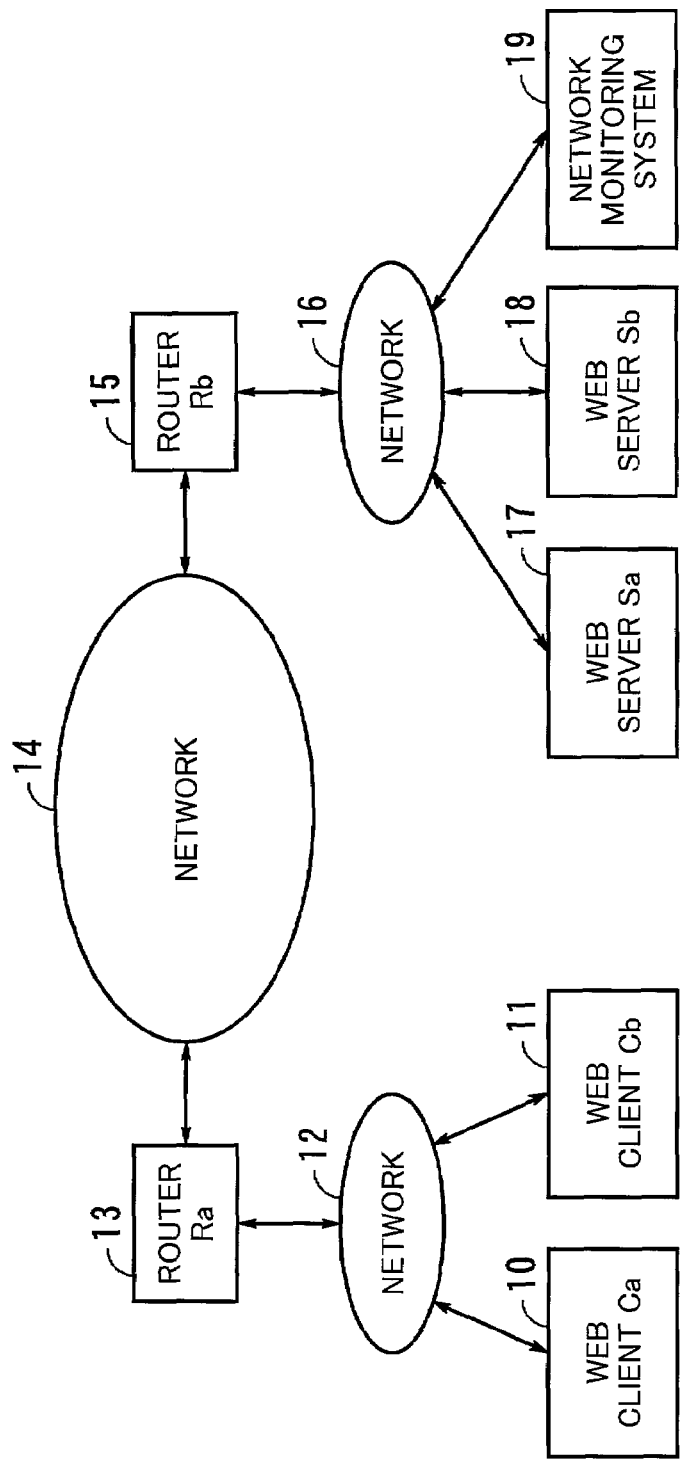
FIG. 2 is a block diagram of a network monitoring system according to an embodiment of the present invention.

Referring next to FIG. 2, a specific embodiment of the present invention will be described. FIG. 2 shows a network system employing a network monitoring system 19 according to the present invention. The illustrated system involves personal-computer-based web clients Ca and Cb (10 and 11), which make access to desired data in remote web servers Sa and Sb (17 and 18). The web servers and clients are interconnected electronically by networks 12, 14, and 16, through routers Ra and Rb (13 and 15) linking those networks with each other.

More specifically, the network 12 is a local area network (LAN), on which the web clients 10 and 11 are located. The network 16 is also a LAN domain accommodating the web servers Sa and Sb. The network monitoring system 19 is attached to this network 16. The network 14, on the other hand, is a wide area network, such as the Internet, to which the networks 12 and 16 are linked through their respective routers Ra and Rb. The routers Ra and Rb serve as the gateway devices between different network domains, determining which way to direct each incoming and outgoing packet. The web servers Sa and Sb, each constructed with an appropriate server machine platform, communicate with the web clients Ca and Cb, sending requested data to them in response to their access requests. The network monitoring system 19 watches the networks 12, 14, and 16 and resources on them.

Figure 3:
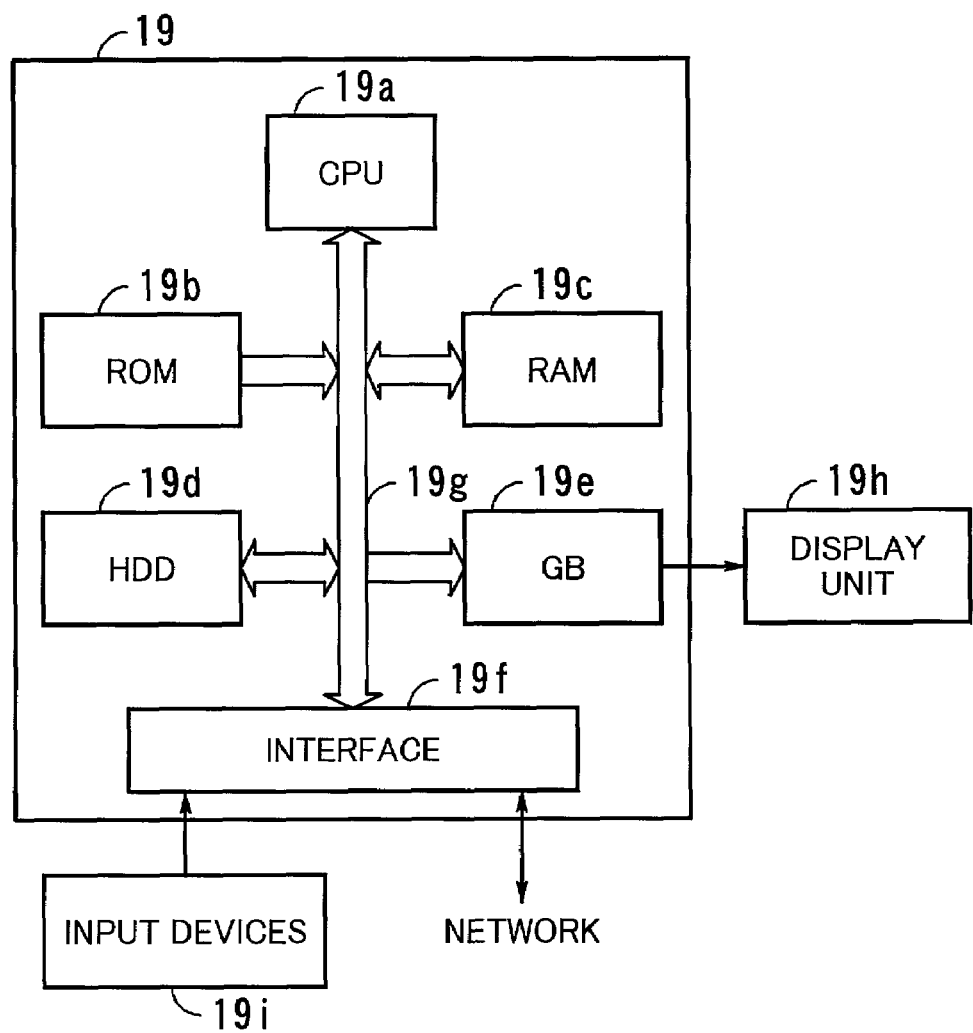
FIG. 3 shows a specific hardware configuration of the network monitoring system shown in FIG. 2.

FIG. 3 shows a specific hardware configuration of the network monitoring system 19 shown in FIG. 2. The network monitoring system 19 comprises the following elements: a central processing unit (CPU) 19a, a read-only memory (ROM) 19b, a random access memory (RAM) 19c, a hard disk drive unit (HDD) 19d, a graphics board (GB) 19e, an interface 19f, and a bus 19g. The network monitoring system 19 is also equipped with an external display unit 19h and input devices 19i.

The CPU 19a performs various operations according to software programs stored in the HDD 19d, besides controlling other parts of the system 19. The ROM 19b stores basic programs and data that the CPU 19a executes and manipulates. The RAM 19c serves as temporary storage for application programs and scratchpad data that the CPU 19a executes and manipulates at runtime. The HDD unit 19d stores various application programs to be executed by the CPU 19a. The graphics board 19e produces image data by interpreting drawing commands sent from the CPU 19a, and it provides the display unit 19h with the resultant images in the form of video signals.

The interface 19f performs protocol translation and data format conversion to allow the CPU 19a to communicate with other devices on the network 16. It also converts data formats of signals sent from the input devices 19i. The bus 19g interconnects the above-described CPU 19a, ROM 19b, RAM 19c, HDD 19d, GB 19e, and I/F 19f, allowing them to exchange data. The display unit 19h comprises a display device such as a cathode ray tube (CRT) to display characters and images supplied from the graphics board 19e. The input devices 19i (e.g., keyboard and mouse) are used by a network administrator to enter operation commands, setup parameters, and other data to the network monitoring system 19.

Figure 4:
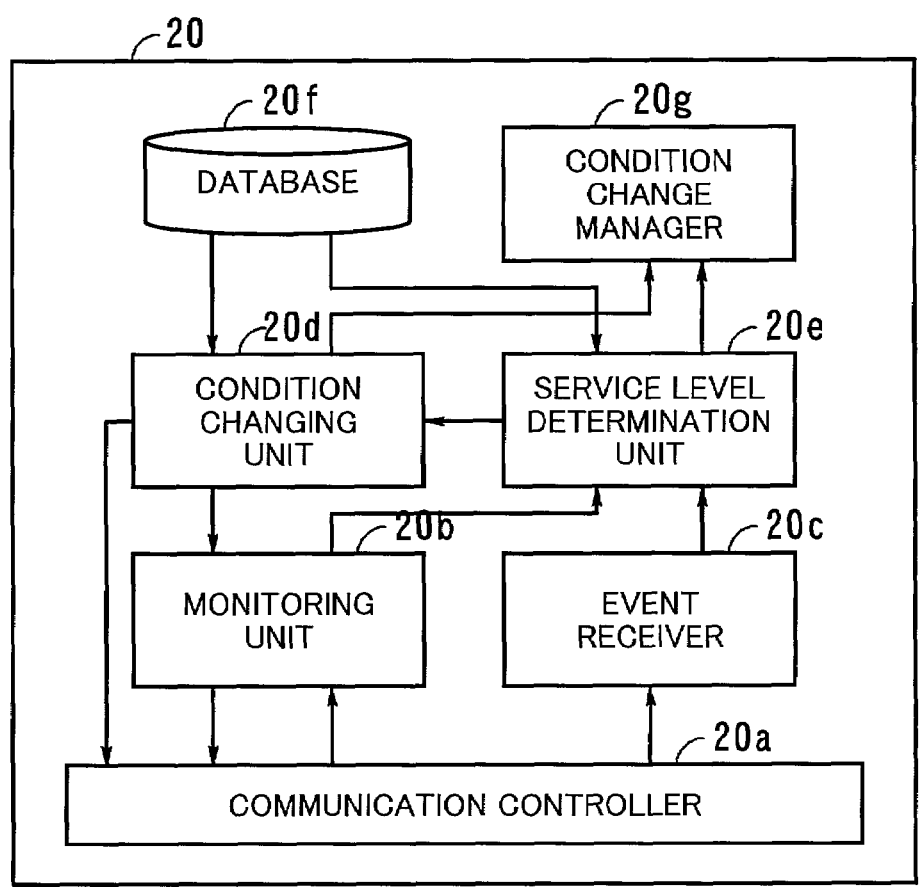
FIG. 4 shows functional blocks implemented as software programs, which are provided in a computer-readable medium according to the present invention, stored in the hard disk drive (HDD) shown in FIG. 3, and executed on an appropriate computer platform for the proposed network monitoring system.

FIG. 4 is a block diagram of a monitoring function 20, the blocks of which are implemented in the form of software programs. According to the present invention, such programs are provided in an appropriate computer-readable medium, stored in the HDD 19d shown in FIG. 3, and executed by the CPU 19a in conjunction with other hardware components of the network monitoring system 19. As FIG. 4 shows, the monitoring function 20 comprises the following blocks: a communication controller 20a, a monitoring unit 20b, an event receiver 20c, a condition changing unit 20d, a service level determination unit 20e, a database 20f, and a condition change manager 20g.

The communication controller 20a performs protocol translation and data format conversion for the purpose of communication with other devices on the network 16. The monitoring unit 20b, a function provided mainly by the CPU 19a shown in FIG. 4, watches a specified set of objects according to predetermined monitoring rules stored in the database 20f. The event receiver 20c, a function provided by the interface 19f, receives messages from the objects which indicate the occurrence of a spontaneous event.

The condition changing unit 20d, another function provided mainly by the CPU 19a, changes the monitoring rules according to the service level determined by the service level determination unit 20e. It also changes allocation of resources on the networks 12, 14, and 16, when required. The service level determination unit 20e is still another function provided mainly by the CPU 19a. It evaluates the monitoring result provided from the monitoring unit 20b and determines the current service level (SL) of each object being monitored, by consulting the database 20f. The determined level of service is referred to herein as the "SL grade." The SL grade determination process is affected by the events arriving at the event receiver 20c. The database 20f is constructed on the HDD 19d to store necessary information for determining the current SL grade. This information is supplied to the service level determination unit 20e when requested. The condition change manager 20g, built on the RAM 19c, centrally manages data about which items are being monitored. This data includes flags indicating whether each object is currently monitored. It also includes data about the current service level and other information.

Figure 5:
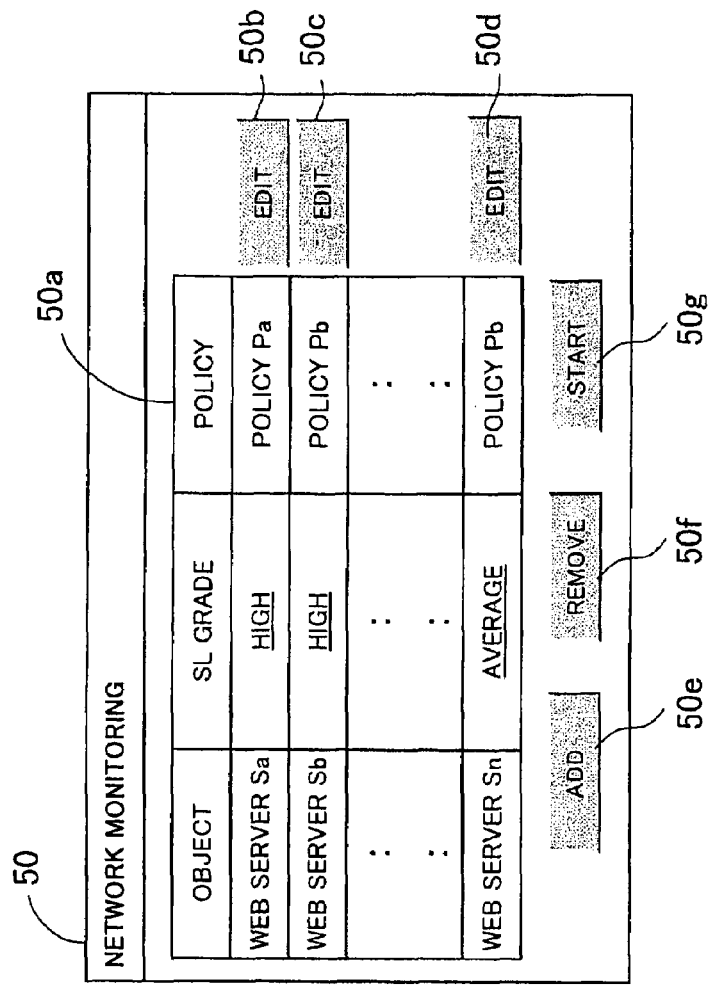
FIG. 5 shows an example of an initial screen which appears on a display unit when the program of the present invention starts running.

The present embodiment operates as follows. FIG. 5 shows an example of the initial screen that appears on the display unit 19h when the program of the present invention is executed. This example screen gives a window 50 entitled "Network Monitoring," the central part of which presents a table 50a summarizing the current setup of monitoring conditions, including monitoring objects, SL grades, and monitoring policies. "Edit" buttons 50b to 50d are attached to the right of the table 50a, one for each row, allowing the user to edit each policy definition to be applied. Further, the following buttons are placed at the bottommost part of the window 50: "Add" button 50e for adding another monitoring object definition to the table 50a; "Delete" button 50f for deleting an existing monitoring object definition, and "Start" button 50g for starting a monitoring operation as defined in the table 50a.

More specifically, the first row of the table 50a shows that the web server Sa is being monitored under the Policy Pa and its performance is graded "High." This SL grade represents the current status of the "primary monitoring item" of the web server Sa. The primary monitoring item of an object refers to a fundamental performance indicator of that object, which is always subject to monitoring.

Figure 6:
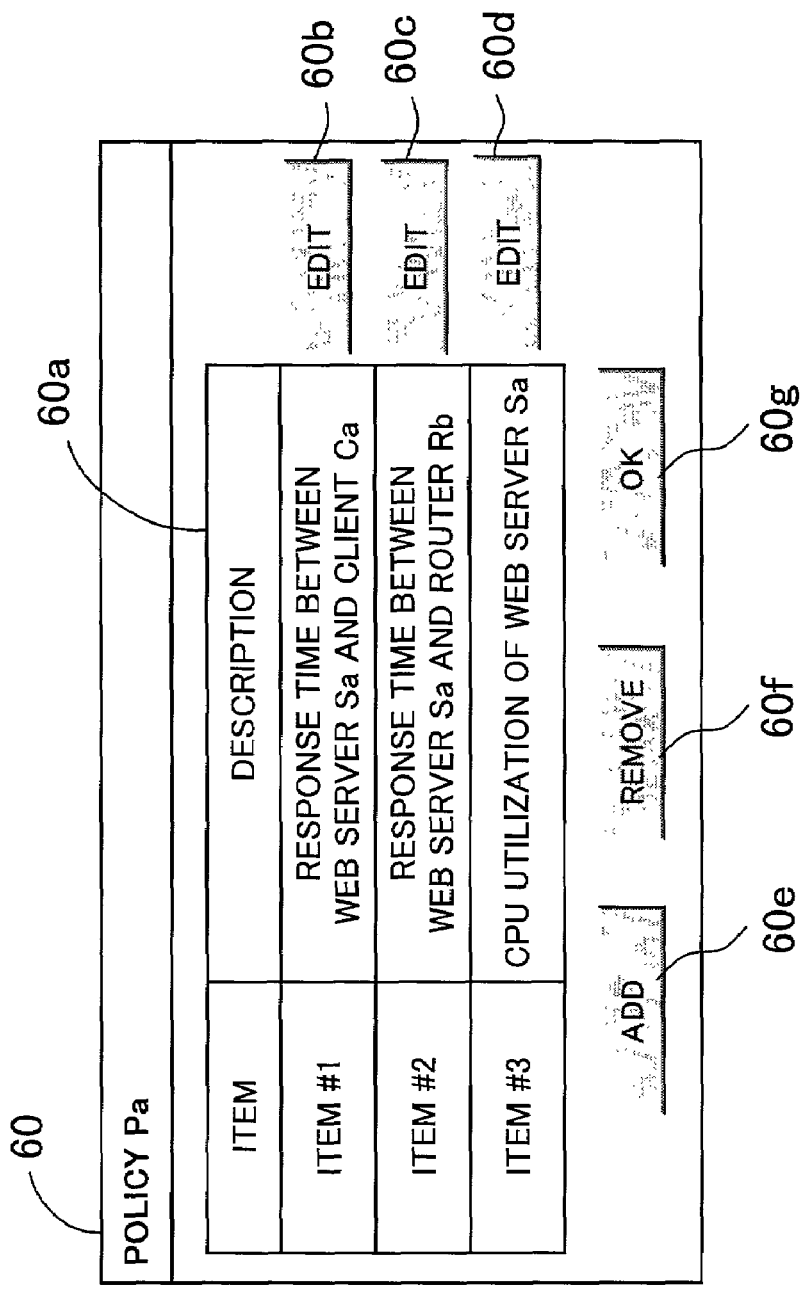
FIG. 6 shows an example screen which appears when the button 50b shown in FIG. 5 is pressed.

In such a window 50, the user presses the button 50b in an attempt to modify the current monitoring policy Pa being applied to the web server Sa. This user action causes the condition changing unit 20d to read out the specified policy definition from the database 20f and create another window 60 on the display unit 19h. FIG. 6 shows this new window 60 entitled "Policy Pa," whose central part gives a table 60a that summarizes the items that may be monitored under the policy Pa. In this example of FIG. 6, the policy Pa includes three monitoring items #1 to #3. The first monitoring item #1, for example, is the response time between the web server Sa and web client Ca. Specified as the second monitoring item #2 is the response time between the web server Sa and router Rb. The third monitoring item #3 is the CPU utilization of the web server Sa.

The user can modify the monitoring rules concerning those three items by pressing their respective "Edit" buttons 60b to 60d being attached to the right of their rows. Further, the following buttons are located at the bottommost part of the window 60: "Add" button 60e for adding a new item definition to the table 60a; "Delete" button 60f for deleting an existing item definition from the table 60a, and "OK" button 60g for completing the setup.

Suppose, for example, that the user presses the "Edit" button 60b to modify the item #1 shown in the window 60. In response to this user operation, the condition changing unit 20d retrieves a relevant record from the database 20f and outputs it to the display unit 19h, resulting in a new window 70 shown in FIG. 7. This window 70 is entitled "Edit: Item #1" and provides the user with a table 70a containing the specifics about how to evaluate the item #1 and how to handle the results. That is, the table 70a contains various policy rules, conditions, and actions for each particular SL grade, which will be applied when monitoring the response time between the web server Sa and web client Ca. While this table 70a actually contains four SL grade entries as will be described later, the window 70 is unable to display all of those entries at a time because of its limited space. The user can scroll through the table 70a by pressing the scroll arrows 70b and 70c or dragging the scroll box 70d to view its hidden part.

The window 70 further employs a "Default" button 70e at its bottommost part to allow the user to change the default values for item #1. The user may modify an entry of the table 70a by pressing "Edit" button 70f, and when finished, he/she presses the "OK" button 70g to make the new setup take effect.

To take a closer look at the table 70a, the uppermost table entry defines the following rules. First, the service level is graded "High" when the response time (Tr) between the web server Sa and web client Ca is shorter than five seconds. Second, the monitoring interval is doubled each time this grade is awarded, until it reaches the limit of 30 minutes. Third, if the SL grade remains "High" for three consecutive monitoring intervals, and if the items #2 and #3 (see FIG. 6) have been monitored, the network monitoring system withdraws those two items #2 and #3 from the current set of monitoring items. Fourth, this SL grade requires no changes in the resource allocation. Lastly, a transition of SL grade from "High" to "Low" occurs when the event receiver 20c is notified of a prescribed event.

The next entry of the table 70a provides the following rules for SL grade "Average." First, the service level is graded "Average" when the response time (Tr) between the web server Sa and web client Ca is equal to or longer than five seconds, but shorter than eight seconds. Second, the monitoring interval is increased by 50 percent each time this grade is awarded, until it reaches the limit of 30 minutes. Third, if the SL grade "Average" is maintained for five consecutive monitoring intervals, and if the items #2 and #3 (FIG. 6) have been monitored, the network monitoring system withdraws those two items #2 and #3 from the current set of monitoring items. Fourth, this SL grade requires no changes in the resource allocation, and lastly, an average-to-low transition occurs in the SL grade when the event receiver 20c is notified of a prescribed event.

The user can change the above definitions by pressing the "Edit" button 70f. When finished, the user presses the "OK" button 70g, which updates the relevant record in the database 20f with a new definition(s).

FIG. 8 shows an example of the definition of item #1 which is stored as a record of the database 20f. The record, shown in table form, corresponds to what appears in the window 70. As this example shows, the response time in question can be classified into the following four different SL grades: "Lowest," "Low," "Average," and "High." For each SL grade, the database 20f gives an applicable range of response times, monitoring conditions, and other information.

Recall that SL grades "Low" and "Lowest" are not fully shown in the window 70 of FIG. 7 because of its limited space. The corresponding database record of FIG. 8 actually defines the SL grade "Low" as follows. First, the service level should be graded "Low" when the response time (Tr) between the web server Sa and web client Ca is equal to or longer than eight seconds, but shorter than fifteen seconds. Second, the monitoring interval is reduced by 50 percent each time this grade is given, until it reaches the limit of three minutes. Third, if the service level stays at this grade for two consecutive monitoring intervals, and if the items #2 and #3 (FIG. 6) have not been monitored, the network monitoring system adds those two items #2 and #3 into the current set of monitoring items. Fourth, the SL grade "Low" requires no changes in the resource allocation. Lastly, the SL grade should be changed from "Low" to "Lowest" when a prescribed event occurs.

The database record of FIG. 8 also provides the following rules. First, the service level should be graded "Lowest" when the response time (Tr) between the web server Sa and web client Ca is longer than fifteen seconds. Second, the monitoring interval is reduced by 50 percent each time this grade is given, until it reaches the limit of one minute. Third, this SL grade causes two other items #2 and #3 to be included in the current set of monitoring items. Fourth, if the service level stays at this grade for three consecutive monitoring intervals, a priority raising processing is invoked. Lastly, the same processing is also invoked when a prescribed event occurs.

Referring back to FIG. 7, suppose that the user has pressed the "Default" button 70e to view or edit default values. In this case, the condition changing unit 20d retrieves a relevant record from the database 20f and displays a new window 80 entitled "Default Setup: Item #1" on the display unit 19h. FIG. 9 shows this window 80, including a table 80a placed in the center of the pane. The table 80a contains some monitoring conditions that were applied when the system started monitoring the Item #1. More specifically, this table 80a shows that the response time between the web server Sa and web client Ca is being monitored regularly at intervals of ten minutes. Further, the reference value for the response time in question is determined by a measurement. Lastly, an event is raised when the response time in question exceeds the threshold of 18 seconds. The window 80 provides an "Edit" button 80b to allow the user to change the above definitions. When finished editing, the user presses the "OK" button 80c, which updates the relevant record in the database 20f with a new definition(s).

By editing or adding data on the above-described various windows 50 to 80, the user can make an appropriate setup for the network monitoring system 19. This setup data includes the definitions of: what objects and items should be monitored, how the service levels are graded, and what monitoring rules will be applied.

While the above discussion has focussed on the first monitoring item #1, the detailed definitions of the remaining items #2 and #3 will now be described below. FIGS. 10 and 11 show the specifics of those items #2 and #3, respectively. Referring first to the monitoring item #2 of FIG. 10, there are three SL grade entries: "High," "Average," and "Low."

The uppermost entry defines the following five rules. First, the service level is graded "High" when the response time (Tr) between the web server Sa and router Rb is shorter than its nominal value (e.g., 100 ms) with tolerance of 10 ms. Second, the monitoring interval is doubled each time this grade is awarded, until it reaches the limit of 30 minutes. Third, if the SL grade continues to be "High" for three consecutive monitoring intervals, the network monitoring system withdraws the item #2 from the current set of monitoring items. Fourth, no changes are required in the resource allocation, and lastly, a change from "High" to "Low" occurs when a prescribed event occurs.

The next SL grade entry defines the following rules. First, the service level is graded "Average" when the response time (Tr) between the web server Sa and router Rb exceeds its nominal value by 10 ms or more, but the excess is smaller than 50 ms. Second, the monitoring interval is elongated by 50 percent within the limit of 30 minutes, each time this grade is awarded. Third, if the SL grade stays at "Average" for five consecutive monitoring intervals, the network monitoring system withdraws this item from the current set of monitoring items. Fourth, no changes are required in the resource allocation, and lastly, a change from "Average" to "Low" occurs when a prescribed event occurs.

The bottommost SL grade entry gives the following rules. First, the service level is graded "Low" when the response time (Tr) between the web server Sa and router Rb exceeds its nominal value by 50 ms or more. Second, the monitoring interval is shortened by 50 percent within the limit of 3 minutes, each time this grade is applied. Third, if the SL grade stays at "Low" for two consecutive monitoring intervals, the network monitoring system adds another item #3 to the current set of monitoring items. Further, when the service level has dropped to this grade, or when a prescribed event has occurred, a priority raising process is invoked to give a higher priority to the delivery of packets from the web server Sa.

Referring next to the monitoring item #3 of FIG. 11, there are four SL grade entries: "High," "Average," "Low," and "Lowest." The uppermost entry defines the following five rules. The first rule says that the service level is graded "High" when the CPU utilization (X) of the web server Sa is lower than 50 percent. Second, the monitoring interval is doubled within the limit of 30 minutes, each time this "High" grade is awarded. Third, if the "High" grade is maintained for three consecutive monitoring intervals, the network monitoring system withdraws the item #3 from the current set of monitoring items. Fourth, this SL grade requires no changes in the resource allocation, and lastly, an SL grade transition from "High" to "Low" occurs when a prescribed event occurs.

The next SL grade entry defines the following rules. First, the service level is graded "Average" when the CPU utilization (X) of the web server Sa is equal to or greater than 50 percent, but lower than 75 percent. Second, the monitoring interval is elongated by 50 percent within the limit of 30 minutes, each time this grade is awarded. Third, if the SL grade stays at "Average" for five consecutive monitoring intervals, the network monitoring system withdraws this item #3 from the current set of monitoring items. Fourth, no changes are required in the resource allocation, and lastly, an SL grade transition from "Average" to "Low" occurs when a prescribed event arises.

Likewise, the subsequent SL grade entry gives the following rules. First, the service level is graded "Low" when the CPU utilization (X) of the web server Sa is equal to or greater than 75 percent, but lower than 95 percent. Second, each time this grade is applied, the monitoring interval is shortened by 50 percent, within the limit of three minutes. Fourth, no changes are required in the resource allocation, and lastly, an SL grade transition from "Low" to "Lowest" occurs when a prescribed event arises.

The bottommost SL grade entry gives the following rules. First, the service level is graded "Lowest" when CPU utilization (X) of the web server Sa is increased to 95 percent or more. Second, each time this grade is applied, the monitoring interval is shortened by 50 percent, within the limit of one minute. No changes are required in the monitoring item selection or resource allocation. Lastly, it is demanded that a warning message be transmitted to the network administrator when a predetermined event occurs.

Assuming the above-described monitoring policy, the next section will explain how the proposed system 19 monitors the web server Sa.

Suppose here that the user has pressed the Start button 50g in the window 50 of FIG. 5 after setting up all monitoring items. This user action causes the condition changing unit 20d to set the new monitoring conditions to the monitoring unit 20b, as well as updating the monitoring policy records in the database 20f. Here, the monitoring unit 20b starts with the default conditions of Policy Pa, which is the policy for the primary monitoring item (i.e., item to be always monitored) of the web server Sa. More specifically, the monitoring unit 20b watches the web server Sa processing a request from the web client Ca and returning a response to it. The response time, in this case, refers to the time between the issuance of a request and the delivery of its result. The monitoring unit 20b regularly measures this response time at intervals of ten minutes by using an agent program installed in the web server Sa. If the web server Sa exhibits a long response time exceeding the 18-second threshold, the monitoring unit 20b raises an event that needs an appropriate action.

The monitoring unit 20b notifies the service level determination unit 20e of the result of its monitoring activity. The service level determination unit 20e compares the response time of the web server Sa with various threshold values defined in the monitoring rules of item #1 (FIG. 8) in an attempt to determine which SL grade is appropriate for the current performance of the web server Sa. Consider, for example, that the response time measures ten seconds. In this case, the service level determination unit 20e grades it "Low," thus reducing by half the monitoring interval. That is, the interval is reduced from ten minutes to five minutes. Five minutes later, another measurement is conducted, resulting in a response time of 13 seconds. This value is large enough for the service level determination unit 20e to maintain the "Low" grade, as well as to reduce the monitoring interval again. The new monitoring interval is three minutes, the lower limit defined in the policy. Because the service level has been graded "Low" for two consecutive intervals, the network monitoring system 19 adds the item #2 (response time between web server Sa and router Rb) to the current set of monitoring items. The monitoring unit 20b now begins watching this new item #2 at default intervals (e.g., ten minutes).

After three minutes (i.e., the monitoring interval for item #1), the monitoring unit 20b measures the response time between the web server Sa and client Ca again. Suppose that the measurement has yielded a response time of 15 seconds at this time. The service level determination unit 20e now sets the SL grade to "Lowest" and then reduces the monitoring interval from three minutes to one and half minutes. It also invokes the monitoring of item #3 (CPU utilization of web server Sa) at default intervals (i.e., ten minutes).

If the service level does not improve even after two monitoring intervals, the network monitoring system determines that it has stayed at "Lowest" for three consecutive intervals. There is even a chance that the response time in question exceeds the threshold of 18 seconds. In those cases, the system commands the router Rb to raise the priority of packet traffic to/from the web server Sa. Suppose that the system observes an improved response time of four seconds after the interval of three minutes, thanks to the raised traffic priority. Since this monitoring result is graded "High," the system then doubles the monitoring interval, i.e., from three minutes to six minutes. If the SL grade continues to be "High" for another two consecutive intervals, the system further lengthens the monitoring interval, first to 12 minutes and then to 24 minutes. The system also withdraws the items #2 and #3 from the current set of monitoring items, accordingly.

During the above sessions, the network monitoring system keeps watching the other monitoring items #2 and #3, according to their respective intervals, grading rules, and dynamic policy changing principles. While the details are not discussed here, the monitoring of items #2 and #3 is performed concurrently with that of item #1, based on similar algorithms. Recall that those items #2 and #3 were added as a result of an observation of the primary monitoring item #1. Their termination, however, may not always be derived from the same monitoring item #1, because of the parallelism of processing mentioned above. See FIG. 10 for the policy of the monitoring item #2 (i.e., response time between server Sa and router Rb), for example. This policy definition includes a rule that allows the item #2 to terminate itself. More specifically, consider that the monitoring of item #2 started with its initial interval of 10 minutes. If the first monitoring session results in a response time of 130 ms, then the system grades it "Average" and lengthens the interval from 10 minutes to 15 minutes. Suppose that the response time of interest is stable and its SL grade maintains the "Average" state. The monitoring interval now increases to 22.5 minutes, and then to 30 minutes, accordingly. At the fifth monitoring session, the system finally determines that monitoring of item #2 is no longer necessary.

Addition of a new monitoring item may be necessitated in the course of network monitoring, due to a monitoring result of the primary monitoring item or any other items. Recall that, in the example case discussed earlier, the monitoring item #3 (CPU utilization of web server Sa) was added as a result of an observation of the primary monitoring item #1. However, this is not the only possible scenario. The item #3 could have already been added to the current set of monitoring items, being triggered by the monitoring activity of item #2. More specifically, consider that the system starts monitoring the item #2 with its initial interval of 10 minutes. If the first monitoring session results in a response time of 150 ms, then the system grades it "Low" and shortens the interval from 10 minutes to 5 minutes. Suppose that the SL grade remains "Low" for another two monitoring intervals. The system then reduces the monitoring interval to three minutes and starts monitoring of item #3 according to the relevant policy definition.

During the above processing, various data showing the current network conditions are gathered into the condition change manager 20g in the network monitoring system 19. Referring back to FIG. 5, the table 50a in the network monitoring window 50 is updated with the current SL grade of each item, reflecting the latest result of network monitoring. More specifically, the table 50a of FIG. 5 indicates that the current performance of the web server Sa is graded "High." The table 50a provides this indication in the form of a hypertext link, which allows the user to jump to another window that gives the detailed information about the web server Sa. FIG. 12 shows an example of such a new window that appears when the user makes a click on that hypertext link. This example window 90, entitled "Web Server Sa," provides a table 90a that summarizes the current situation of the web server Sa, which is being monitored as the primary monitoring item #1. More specifically, the table 90a shows that: the current service of the Web server Sa is graded "High"; its observed response time is 3.1 seconds; the current monitoring interval is 20 minutes; there are no additional monitoring items; there is no change in the related resources; and there is no particular event raised.

While the illustrated window 90 only shows the monitoring item #1, the fourth data field "Items Added" of the table 90a may contain hypertext links to the items #2 and #3, if they are included as the additional monitoring items. If those links are clicked by the user, the system will produce another window of a similar kind to show the current monitoring result of the item #2 or #3.

The above sections have explained the network monitoring system according to the present invention. The proposed system is designed to tune itself to the actual network conditions, dynamically varying its monitoring rules, depending on the observed SL grades, or in response to the occurrence of predefined events. This feature of the present invention enables the system to watch the network activities always on an effective monitoring policy. When the network shows stable SL grades, the system adaptively lengthens its monitoring interval and narrows down the coverage of monitoring. In this way, the proposed system automatically reduces the amount of extra traffic that it produces, thus minimizing the burden on the network being monitored. When, on the other hand, the network shows lower SL grades, the proposed system adaptively shortens its monitoring interval, as well as broadening the coverage of monitoring. In this manner, the system collects necessary data for troubleshooting or automatically reconfigures related network resources to improve the service level of the network.

Referring next to the flowcharts of FIGS. 13 to 16, various processes executed by the proposed network monitoring system 19 will be described. These flowcharts illustrate software implementation of the functional blocks shown in FIG. 4.

Figure 13:
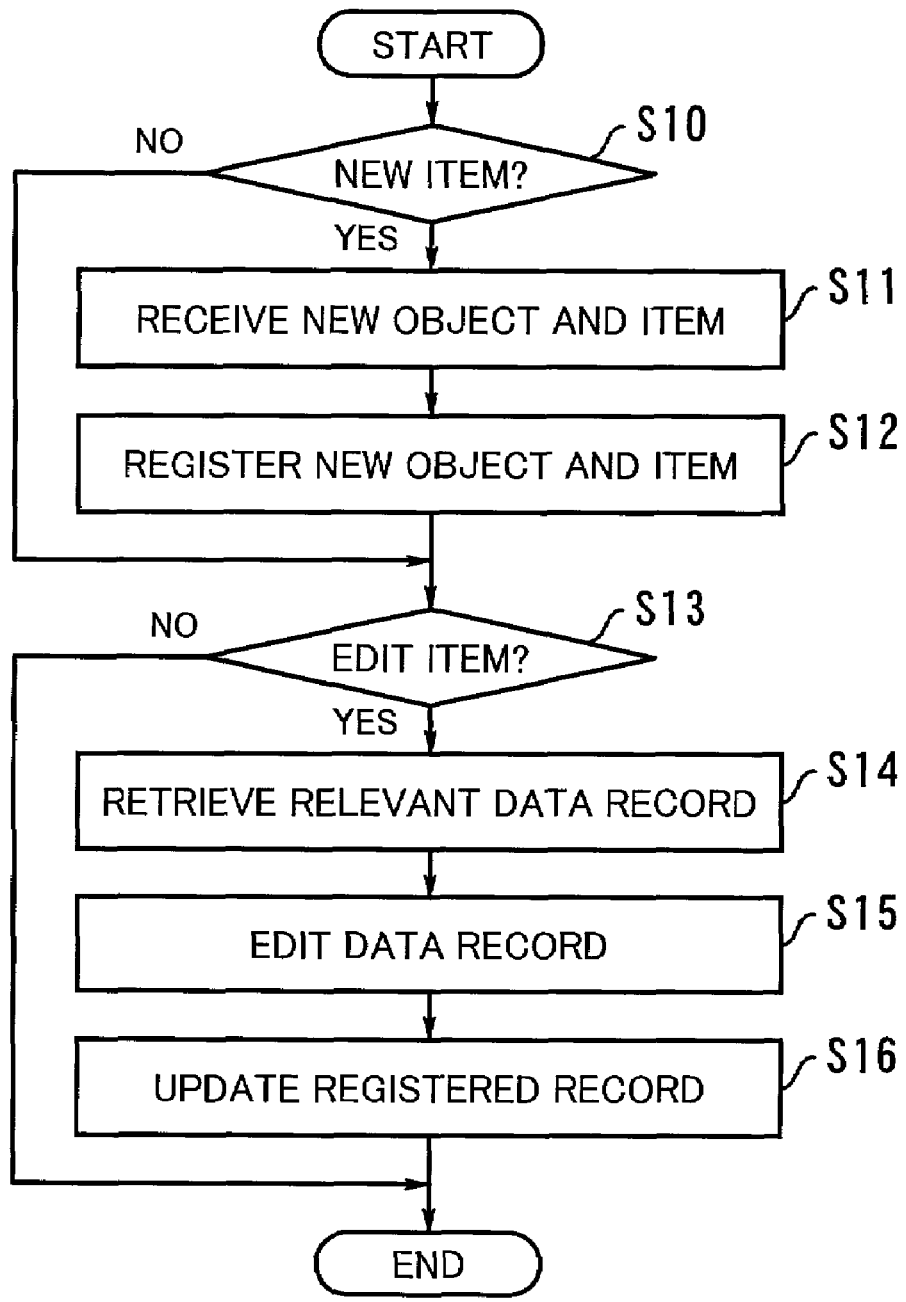
FIG. 13 is a flowchart of a process which is executed when registering a new item to the network monitoring system or editing an existing item in the network monitoring system.

FIG. 13 is a flowchart of a process which is executed when registering a new item to the network monitoring system 19 or editing an existing monitoring item. This process comprises the following steps.

(S10) By testing the status of the "Add" button 50e, the CPU 19a determines whether the user wishes to add a new monitoring item. If the button 50e is pressed, the process advances to step S11. If not, the process skips to step S13.

(S11) The user enters data about which object and what item of that object to monitor, and the CPU 19a receives this data. More specifically, the network monitoring system 19 interacts with the user through the windows 60 and 70 described earlier in FIGS. 6 and 7, allowing him/her to specify a new monitoring item.

(S12) The CPU 19a saves the data obtained at step S11 into the HDD 19d, thus registering the new item.

(S13) The CPU 19a determines whether the user wishes to edit a particular existing monitoring item that is registered in the HDD 19d. The user signifies this by making a click on one of the Edit buttons 50b to 50d (FIG. 5), 60b to 60d (FIG. 6), and 70f (FIG. 7). If such a click is detected, the process advances to step S14. If not, the process is terminated.

(S14) The CPU 19a retrieves from the HDD 19d a record relevant to the object or item specified at step S13.

(S15) The CPU 19a allows the user to edit the record retrieved at step S14, interacting through, for example, the window 70 (FIG. 7) on the display unit 19h.

(S16) The CPU 19a saves the data edited at step S15 into the HDD 19d, thus updating the registered record.

In this way, the process of FIG. 13 permits the user to define and set a new monitoring item, as well as to edit an existing item.

Figure 14:
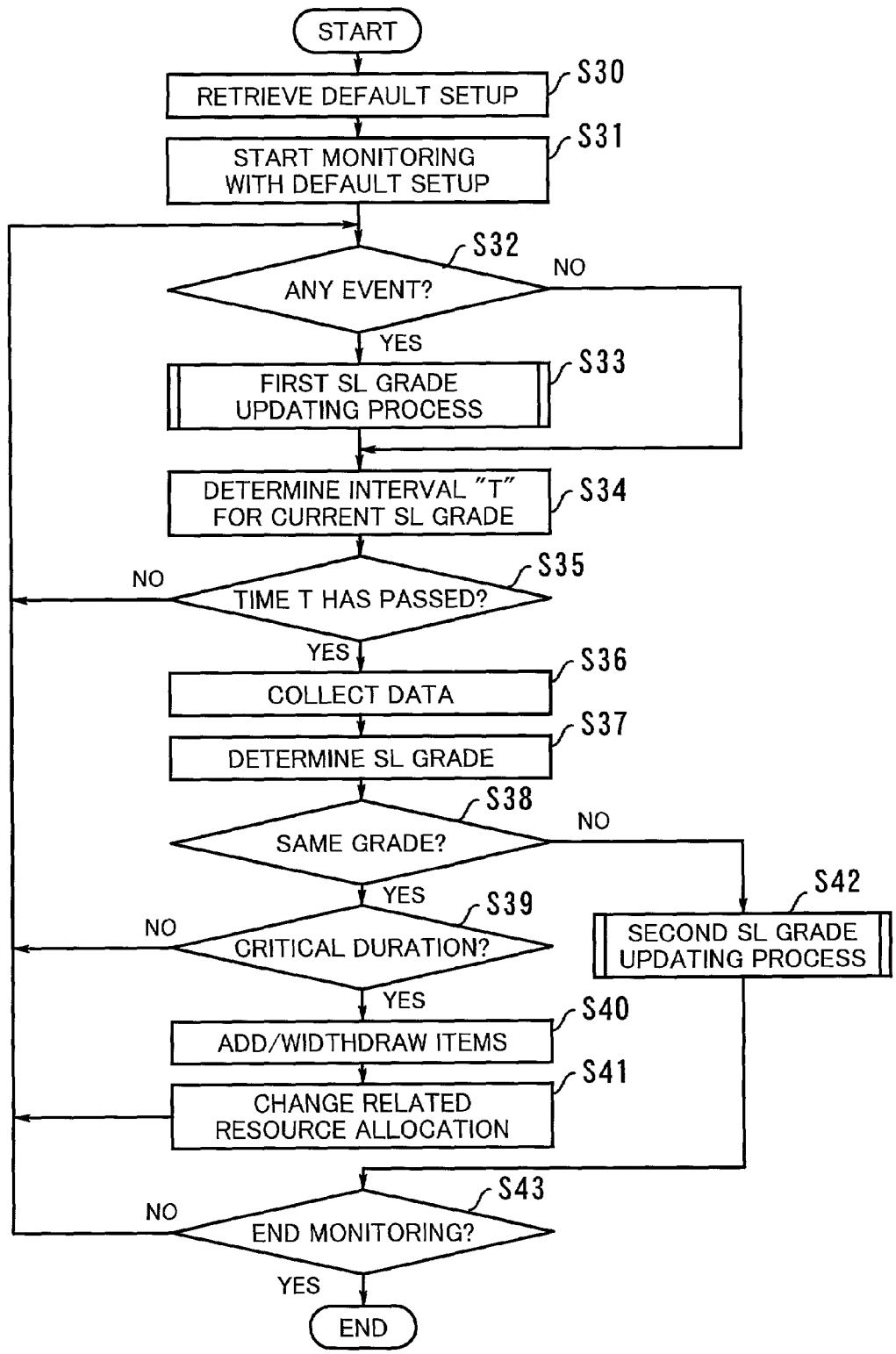
FIG. 14 is a flowchart of a process executed while the network is being monitored.

FIG. 14 is a flowchart of a process that is executed while the system is monitoring a network. This process comprises the following steps.

(S30) Scanning relevant data records stored in the HDD 19d, the CPU 19a retrieves default setup data for the primary monitoring item of a particular monitoring object. For example, the default setup data of Item #1 (FIG. 6) is retrieved when the web server Sa is chosen as a monitoring object.

(S31) The CPU 19a starts monitoring the object with the default setup.

(S32) The CPU 19a determines whether there is any event raised. If there is such an event, the process advances to step S33. Otherwise, the process skips to step S34.

(S33) Now that an event is detected, the CPU 19a executes a process to update the SL grade accordingly. This process is referred to as the "first SL grading process," the details of which will be described later in FIG. 15.

(S34) From a relevant record stored in the HDD 19d, the CPU 19a determines the monitoring interval (T) corresponding to the current SL grade.

(S35) The CPU 19a determines how much time has passed since the last monitoring session. If the elapsed time has reached T, the process advances to step S36. Otherwise, the process returns to step S32 and repeats the above processing.

(S36) The CPU 19a executes monitoring; i.e., it collects data about the current status or activity of the item of interest.

(S37) Comparing the monitoring result obtained at step S36 with relevant threshold values stored in the HDD 19d, the CPU 19a determines the SL grade of the monitoring object of interest.

(S38) If the determined SL grade is the same as the previous one, the CPU 19a advances the process to step S39. If not, the process branches to step S42.

(S39) The CPU 19a determines how long, or for how many intervals, the same SL grade has been maintained. If the intervals amount to a critical duration specified in a relevant policy record stored in the HDD 19d, the process advances to step S40. Otherwise, the process returns to step 32, thus repeating the above-described steps.

(S40) In the case the SL grade stays at the same level for a certain number of intervals, the system may apply some predetermined rules for adding or canceling of a monitoring item. According to this rule, the CPU 19a adds a new item(s) to, or withdraws an existing one(s) from, the current set of monitoring items.

(S41) In the case the SL grade stays at the same level for a certain number of intervals, the system may apply some predetermined rules that specify some related resources whose allocation should be changed. If this is the case, the CPU 19a changes the allocation of such related resources, consulting relevant rules stored in the HDD 19d.

(S42) Now that a different SL grade is obtained, the CPU 19a executes a "second SL grade changing process" which is meant for such a case. The details of this process will be described later in FIG. 16.

(S43) The CPU 19a determines whether the termination of monitoring is requested. If so, the CPU 19a exits from the present process. If not, the process returns to step S32, thus repeating the above steps.

Through the above processing steps, the proposed network monitoring system watches a specified set of objects and determines their respective SL grades according to the monitoring results. While the flowchart of FIG. 14 shows the processing for a single monitoring object, a plurality of similar processes will run concurrently when there are two or more objects to be monitored. Incidentally, the process flow of FIG. 14 may be slightly modified in such a way that it will proceed from step S39 and/or S41 to step S43, instead of returning directly to step S32.

Figure 15:
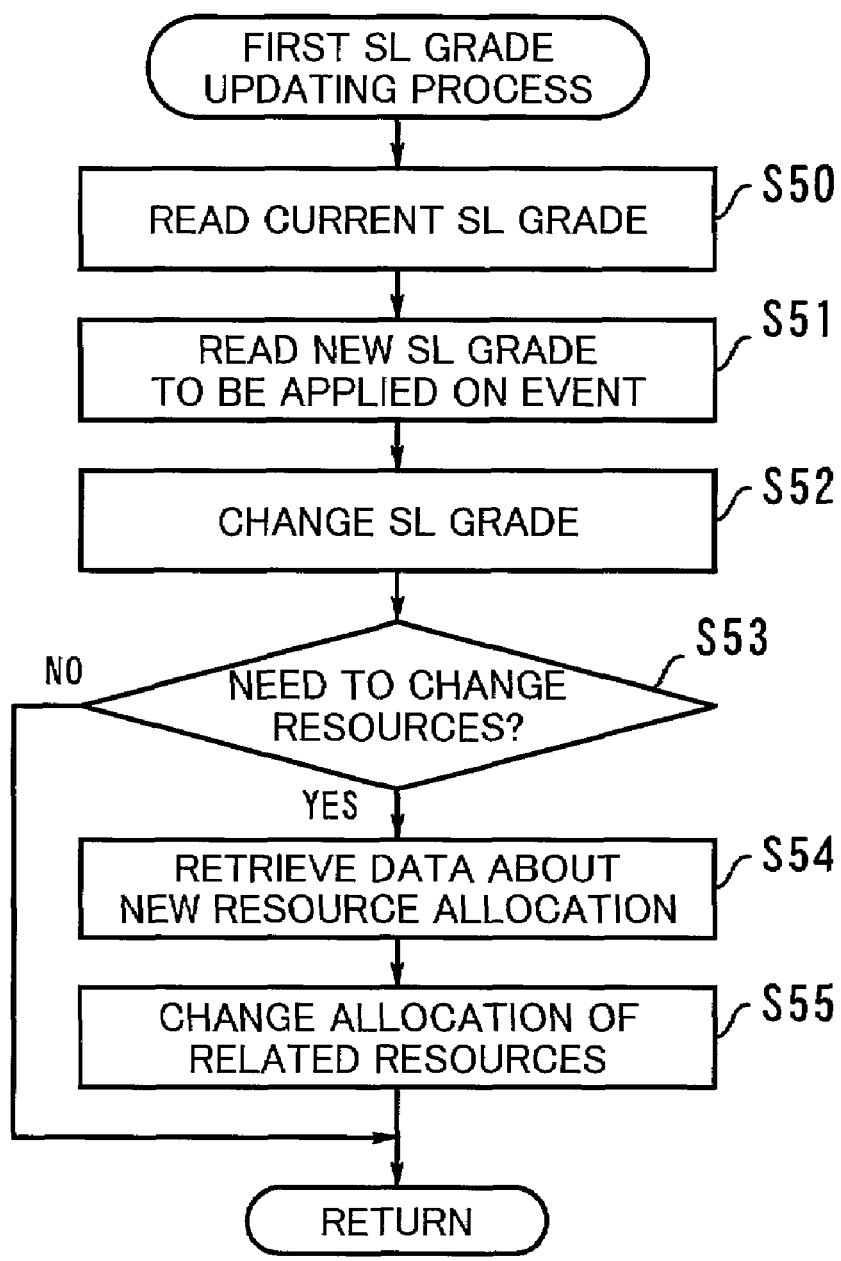
FIG. 15 is a flowchart detailing the first SL grade updating process of step S33 shown in FIG. 14.

Referring to FIG. 15, the first SL grade updating process of step S33 shown in FIG. 14 is shown in detail. This process comprises the following steps.

(S50) The CPU 19a reads the current SL grade of the primary monitoring item from the RAM 19c.

(S51) Consulting the current monitoring policy stored in the HDD 19d, the CPU 19a determines which SL grade to give in this particular event.

(S52) The CPU 19a changes the current SL grade to the one determined at step S51.

(S53) Consulting the current monitoring policy stored in the HDD 19d, the CPU 19a determines whether any related resource needs a change. If so, the process advances to step S54. If not, the control is returned to the calling process (i.e., step S34 of FIG. 14).

(S54) The CPU 19a makes access to the HDD 19d to retrieve data necessary for identifying which related resource to change and how.

(S55) According to the data retrieved at step S54, the CPU 19a changes the setup of the specified resource. The control is then returned to the calling process.

Through above-described processing steps, the proposed network monitoring system changes the SL grade and related resource setup in response to a predetermined event.

Figure 16:
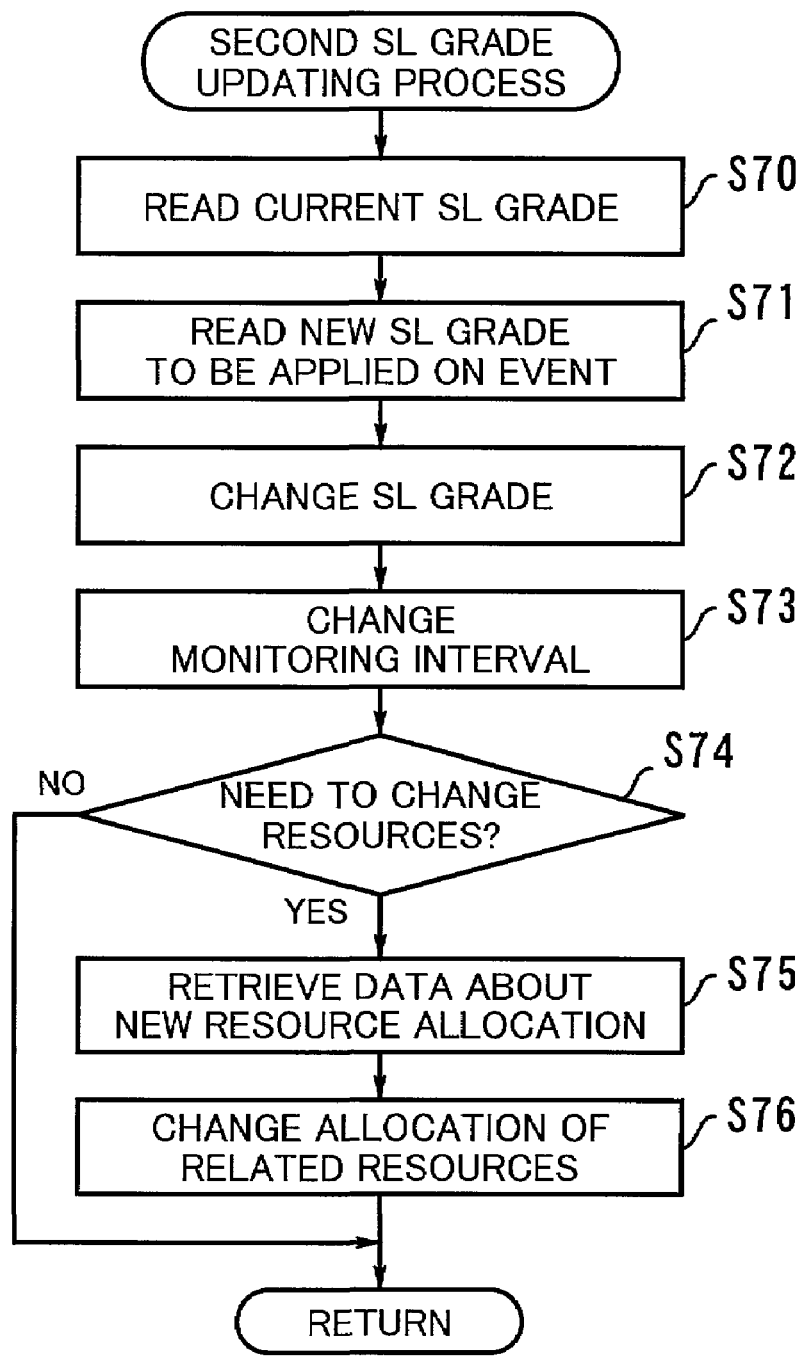
FIG. 16 is a flowchart detailing the second SL grade updating process of step S42 shown in FIG. 14.

Referring next to FIG. 16, the second SL grade updating process of step S42 (FIG. 14) is shown in detail. This process comprises the following steps.

(S70) The CPU 19a reads the current SL grade of the primary monitoring item from the RAM 19c.

(S71) Consulting relevant data stored in the HDD 19d, the CPU 19a determines which the SL grade of the monitoring object in question.

(S72) The CPU 19a changes the current SL grade to the one determined at step S71.

(S73) The CPU 19a changes the current monitoring interval to the one appropriate to the SL grade determined at step S71.

(S74) The CPU 19a determines whether any related resource needs a change. If so, the process advances to step S75. If not, the control is returned to the calling process (i.e., step S43 of FIG. 14).

(S75) The CPU 19a makes access to the HDD 19d to retrieve data necessary for identifying which related resource to change and how.

(S76) According to the data retrieved at step S75, the CPU 19a changes the setup of the specified resource. The control is then returned to the calling process.

Through above-described processing steps, the proposed network monitoring system changes dynamically the monitoring interval, as well as related resource setup, in response to a change in the SL grade.

The present invention has been described so far, assuming such a situation where web servers are subject of monitoring. It is, however, not intended to limit the scope of the invention to this particular case. Rather, the present invention is also applicable in monitoring various types of network devices, such as web servers, routers, and any other facilities and resources on the network.

Also, while the description has assumed that the response time between a web server and a web client is specified as the primary monitoring item, it is not intended to limit the scope of the invention to this specific example. It will be readily appreciated that other items can be specified as the primary monitoring item.

The above-described mechanisms of the present invention are actually implemented as software functions of a computer system. The processing steps of the proposed network monitoring system are encoded in a computer program, which will be stored in a computer-readable storage medium. The computer system executes this program to provide the intended functions of the present invention. Suitable computer-readable storage media include magnetic storage media and solid state memory devices. Other portable storage media, such as CD-ROMs and floppy disks, are particularly suitable for circulation purposes. Further, it will be possible to distribute the programs through an appropriate server computer deployed on a network. The program file delivered to a user is normally installed in his/her computer's hard drive or other local mass storage devices, which will be executed after being loaded to the main memory.

The above discussion will now be summarized as follows. According to the present invention, the current monitoring policy is set in a monitoring policy setting unit, and a monitoring unit performs monitoring of a network according to that policy. Depending on the monitoring result reported by the monitoring unit, a monitoring policy changing unit changes the current monitoring policy being set in the monitoring policy setting unit. This mechanism permits the monitoring policy to be changed dynamically in accordance with the actual condition of the network, so that the system will provide optimal coverage and frequency of monitoring.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable medium storing a program for monitoring activities on a network, the program causing a computer system to function as:
    monitoring policy setting means for setting a monitoring policy;
    monitoring means for monitoring the network according to the policy set in said monitoring policy setting means; and
    monitoring policy changing means for automatically changing the current monitoring policy being set in said monitoring policy setting means, according to a monitoring result reported by said monitoring means,
    wherein said monitoring policy changing means automatically increases the frequency of the monitoring and adds a new object or item to the coverage of the monitoring, when degradation in service level of the network is observed; and
    wherein said monitoring policy changing means automatically decreases the frequency of the monitoring and withdraws an existing object or item from the coverage of the monitoring, when improvement in service level of the network is observed.

2. The computer-readable medium according to claim 1, wherein the monitoring policy includes a parameter that specifies how frequently the monitoring will be conducted.

3. The computer-readable medium according to claim 1, wherein the monitoring policy includes a parameter that specifies which object to monitor.

4. The computer-readable medium according to claim 1, wherein the monitoring policy includes a parameter that specifies which item to monitor.

5. The computer-readable medium according to claim 1, further storing a program which causes the computer system to function as resource setup changing means for changing a setup of a predetermined set of resources on the network according to the monitoring result reported by said monitoring means.

6. The computer-readable medium according to claim 1, further storing a program which causes the computer system to function as event detecting means for detecting the occurrence of a particular event in a predetermined resource on the network,
    wherein said monitoring policy changing means changes the current monitoring policy in response to the particular event detected by said event detecting means.

7. A network monitoring system which monitors activities on a network, comprising:
    monitoring policy setting means for setting a monitoring policy;
    monitoring means for monitoring the network according to the policy set in said monitoring policy setting means; and
    monitoring policy changing means for automatically changing the current monitoring policy being set in said monitoring policy setting means, according to a monitoring result reported by said monitoring means,
    wherein said monitoring policy changing means automatically increases the frequency of the monitoring and adds a new object or item to the coverage of the monitoring, when degradation in service level of the network is observed; and
    wherein said monitoring policy changing means automatically decreases the frequency of the monitoring and withdraws an existing object or item from the coverage of the monitoring, when improvement in service level of the network is observed.

8. A method of monitoring activities on a network, comprising the steps of:
    (a) setting a monitoring policy;
    (b) monitoring the network according to the set monitoring policy;
    (c) automatically changing a current monitoring policy that is originally set by said setting a monitoring policy, According to a monitoring result obtained at said monitoring;
    (d) automatically increasing the frequency of the monitoring and adding a new object or item to the coverage of the monitoring, when degradation in service level of the network is observed; and
    (e) automatically decreasing the frequency of the monitoring and withdrawing an existing object or item from the coverage of the monitoring, when improvement in service level of the network is observed.

* * * * *